US011330836B2

(12) United States Patent
Jeong et al.

(10) Patent No.: US 11,330,836 B2
(45) Date of Patent: May 17, 2022

(54) LYOCELL MATERIAL FOR TOBACCO FILTER

(71) Applicants: KOLON INDUSTRIES, INC., Gwacheon-si (KR); KT&G CORPORATION, Daejeon (KR)

(72) Inventors: Jong Cheol Jeong, Yongin-si (KR); Woo Chul Kim, Yongin-si (KR); Sang Woo Jin, Yongin-si (KR); Burm Ho Yang, Daejeon (KR); Man Seok Seo, Daejeon (KR); Kyung Joon Lee, Daejeon (KR); Hyun Suk Cho, Daejeon (KR); Jong Yeol Kim, Daejeon (KR)

( * ) Notice: Subject to any disclaimer, the term of this patent is extended or adjusted under 35 U.S.C. 154(b) by 254 days.

(21) Appl. No.: 16/688,838

(22) Filed: Nov. 19, 2019

(65) Prior Publication Data

US 2020/0085094 A1    Mar. 19, 2020

Related U.S. Application Data

(62) Division of application No. 14/392,274, filed as application No. PCT/KR2014/004881 on Jun. 2, 2014, now Pat. No. 10,517,325.

(30) Foreign Application Priority Data

Jun. 28, 2013 (KR) .................. 10-2013-0075002

(51) Int. Cl.
| | | |
|---|---|---|
| A24D 3/02 | (2006.01) | |
| B29C 48/00 | (2019.01) | |
| D01D 5/06 | (2006.01) | |
| D01F 2/00 | (2006.01) | |
| A24D 3/10 | (2006.01) | |
| A24D 3/06 | (2006.01) | |
| D02G 1/12 | (2006.01) | |
| D01D 1/02 | (2006.01) | |
| D01D 10/06 | (2006.01) | |
| D02G 1/00 | (2006.01) | |
| B29K 1/00 | (2006.01) | |
| B29L 31/14 | (2006.01) | |
| B29L 31/00 | (2006.01) | |

(52) U.S. Cl.
CPC ........... *A24D 3/0204* (2013.01); *A24D 3/068* (2013.01); *A24D 3/10* (2013.01); *B29C 48/0019* (2019.02); *B29C 48/022* (2019.02); *D01D 1/02* (2013.01); *D01D 5/06* (2013.01); *D01D 10/06* (2013.01); *D01F 2/00* (2013.01); *D02G 1/00* (2013.01); *D02G 1/12* (2013.01); *B29K 2001/12* (2013.01); *B29L 2031/14* (2013.01); *B29L 2031/7416* (2013.01); *D10B 2201/28* (2013.01); *D10B 2503/00* (2013.01)

(58) Field of Classification Search
CPC .......... A24D 3/024; A24D 3/068; A24D 3/10; A24D 3/0204; B29C 47/0004; B29C 47/0059; B29C 48/022; B29C 48/0019; D01D 1/02; D01D 5/06; D01D 10/06; D01F 2/00; D01F 2/24; D01G 1/00; D01G 1/12

See application file for complete search history.

(56) References Cited

U.S. PATENT DOCUMENTS

| | | | |
|---|---|---|---|
| 3,756,253 A | 9/1973 | Honda et al. | |
| 4,246,221 A | 1/1981 | McCorsley | |
| 4,416,698 A | 11/1983 | McCorsley | |
| 5,063,945 A * | 11/1991 | Sugihara .................. | A24D 3/08 493/42 |
| 5,225,277 A | 7/1993 | Takegawa et al. | |
| 5,707,737 A | 1/1998 | Mori et al. | |
| 5,738,119 A | 4/1998 | Edwards, III et al. | |
| 6,017,479 A | 1/2000 | Helms, Jr. et al. | |
| 6,177,194 B1 | 1/2001 | Koppe | |
| 7,534,379 B2 | 5/2009 | Ellison et al. | |
| 2004/0126577 A1* | 7/2004 | Lee ....................... | B29C 48/919 428/364 |
| 2004/0237982 A1 | 12/2004 | Dollhopf et al. | |
| 2005/0019564 A1* | 1/2005 | Kwon ...................... | D02G 3/48 428/364 |
| 2005/0160939 A1 | 7/2005 | Kwon et al. | |
| 2005/0283958 A1 | 12/2005 | Sanderson et al. | |
| 2005/0287368 A1* | 12/2005 | Corallo .................. | D06M 7/00 428/375 |
| 2009/0127750 A1 | 5/2009 | Bhushan et al. | |
| 2010/0021711 A1 | 1/2010 | Schrempf et al. | |
| 2010/0281662 A1 | 11/2010 | Manner et al. | |
| 2016/0286854 A1 | 10/2016 | Jeong et al. | |

(Continued)

FOREIGN PATENT DOCUMENTS

| | | |
|---|---|---|
| CN | 1123042 A | 5/1996 |
| CN | 1139961 A | 1/1997 |

(Continued)

OTHER PUBLICATIONS

Bajaj,P.,"SpinFinishesforManufacturedFibres," ManufacturedFibre Technology,1997,Chapman&Hall,London.(Year: 1997) (Year: 1997).*
"Lubrication",RandomHouseDictionary, © RandomHouse,Inc. 2017,accessedatDictionary.comonSep. 26, 2017.(Year:2017) (Year: 2017).*

(Continued)

*Primary Examiner* — Joseph S Del Sole
*Assistant Examiner* — Jamel M Nelson
(74) *Attorney, Agent, or Firm* — Harvest IP Law, LLP

(57) ABSTRACT

A lyocell material for a cigarette filter and a method of manufacturing the same are disclose. The lyocell material which is biodegradable and eco-friendly can be manufactured by crimping lyocell multifilaments to obtain a crimped tow.

5 Claims, No Drawings

(56) References Cited

U.S. PATENT DOCUMENTS

| | | | |
|---|---|---|---|
| 2017/0156394 | A1 | 6/2017 | Jeong et al. |
| 2018/0007952 | A1 | 1/2018 | Jin et al. |

FOREIGN PATENT DOCUMENTS

| | | | | |
|---|---|---|---|---|
| CN | 1356412 | A | 7/2002 | |
| CN | 1576403 | A | 2/2005 | |
| CN | 1688637 | A | 10/2005 | |
| CN | 101501252 | A | 8/2009 | |
| CN | 102595942 | A | 7/2012 | |
| DE | 10053359 | A1 | 5/2002 | |
| EP | 0797696 | B1 | 7/1998 | |
| EP | 0 766 519 | | 11/1998 | |
| EP | 0703997 | B1 | 8/1999 | |
| EP | 2490557 | A1 | 8/2012 | |
| EP | 3051011 | A1 | 8/2016 | |
| GB | 1155070 | A | 6/1967 | |
| GB | 2474694 | | 4/2011 | |
| JP | 48-80824 | A | 10/1973 | |
| JP | 9-509987 | A | 10/1997 | |
| JP | 10-168650 | A | 6/1998 | |
| JP | 10-505886 | A | 6/1998 | |
| JP | 2001-501687 | A | 2/2001 | |
| JP | 2001-510245 | A | 7/2001 | |
| JP | 2001-316936 | A | 11/2001 | |
| JP | 2005-42286 | A | 2/2005 | |
| JP | 2007-534789 | A | 11/2007 | |
| JP | 2009-540139 | A | 11/2009 | |
| KR | 10-2003-0061374 | A | 7/2003 | |
| KR | 10-0471549 | B1 | 3/2005 | |
| KR | 10-0769974 | B1 | 10/2007 | |
| KR | 10-2012-0032932 | A | 4/2012 | |
| KR | 10-1455006 | B1 | 10/2014 | |
| KR | 10-1455002 | B1 | 11/2014 | |
| WO | 94/27903 | A1 | 12/1994 | |
| WO | 94/28220 | | 12/1994 | |
| WO | 9427903 | A1 | 12/1994 | |
| WO | 95/24520 | | 9/1995 | |
| WO | 9524520 | | 9/1995 | |
| WO | WO-9524520 | A1 * | 9/1995 | ........... A24D 3/0204 |
| WO | 0063470 | | 10/2000 | |
| WO | 2006/071101 | | 7/2006 | |
| WO | 2007/143762 | A1 | 12/2007 | |
| WO | 2009/000453 | | 12/2008 | |
| WO | 2011/048397 | A1 | 4/2011 | |
| WO | 2012002729 | A2 | 1/2012 | |
| WO | 2014/009498 | | 1/2014 | |

OTHER PUBLICATIONS

United States Patent and Trademark Office Communication dated Feb. 21, 2020, issued in U.S. Appl. No. 15/322,753.

R. Beyreuther and H. Brunig, Dynamics of Fibre Formation and Processing, p. 46 (Year: 2007).

International Searching Authority, International Search Report of PCT/KR2014/004881 dated Aug. 27, 2014 [PCT/ISA/210].

Japanese Patent Office, Communication dated Dec. 14, 2016, issued in counterpart Japanese Application No. 2016-523626.

State Intellectual Property Office of People's Republic of China; Communication dated Jan. 17, 017 in counterpart application No. 201480036781.8.

European Patent Office, Supplementary European Search Report dated Feb. 1, 2017 by the European Patent Office in European Application No. 14 817842.

Chavan et al., "Development and Processing of Lyocell", Indian Journal of Fibre & Textile Research, vol. 29, Dec. 2004, pp. 483-492.

"Tencel HS260 Lyocell Fiber for Nonwovens", Chemical Fibers International, IBP Press, vol. 52, No. 52, Dec. 2002, pp. 409.

Communication dated May 25, 2017, issued by the Russian Patent Office in counterpart Russian Application No. 2016102643.

International Search Report for PCT/KR2015/014207 dated Apr. 4, 2016.

International Search Report of PCT/KR2015/006665 dated Sep. 22, 2015 [PCT/ISA/210].

European Patent Office; Communication dated Feb. 8, 2018, in European application No. 15815965.7.

European Paetnt Office, Communication dated Oct. 2, 2018 in European Application No. 15815965.7.

Japanese Patent Office; Communication dated Jul. 2, 2018 in JP application No. 2016-574041.

The State Intellectual Property Office of the P.R.C.; Communication dated Jul. 9, 2018 in CN application No. 201580035675.2.

Japanese Patent Office; Communication dated Oct. 30, 2017 in JP application No. 2016-574041.

European Patent Office, Communication dated Jul. 12, 2018, issued in European Application No. 15875602.3.

United States Patent and Trademark Office, communication dated May 9, 2019 in U.S. Appl. No. 15/540,873.

United States Patent and Trademark Office, communication dated Jul. 5, 2019 in U.S. Appl. No. 15/322,753.

"Lubrication", Random House Dictionary, (C) Random House, Inc. 2017, accessed at Dictionary.com on Sep. 26, 2017. (Year: 2017).

Bajaj, P., "Spim Finishes for Manufactured Fibres," Manufactured Fibre Technology, 1997, Chapman & Hall, London. (Year: 1997).

* cited by examiner

LYOCELL MATERIAL FOR TOBACCO FILTER

CROSS-REFERENCE TO RELATED APPLICATIONS

This application is a Continuation of U.S. application Ser. No. 14/392,274 filed on Dec. 24, 2015, which is a National Stage Entry of International Application No. PCT/KR2014/004881 filed on Jun. 2, 2014, which claims priority from the Korean Patent Application No. 10-2013-0075002, filed on Jun. 28, 2013, in the Korean Intellectual Property Office, the disclosures of which are incorporated herein by reference in their entireties.

TECHNICAL FIELD

The present invention relates to a lyocell material for a cigarette filter and a method of manufacturing the same.

BACKGROUND ART

A cigarette filter is composed mainly of cellulose acetate fibers. Cellulose acetate fibers are currently manufactured as follows. Specifically, cellulose acetate fibers are obtained in such a manner that a cellulose acetate flake is dissolved in a solvent such as acetone, thus preparing a cellulose acetate spinning solution, after which the spinning solution is fed into a spinning nozzle device and spun in a high-temperature atmosphere using a dry spinning process.

Especially useful as fibers for a cigarette filter, cellulose acetate fibers are appropriately adjusted in fineness so as to facilitate the production of a cigarette filter, and are finally provided in the form of a fiber tow having a crimped band. Then, the cellulose acetate fiber tow is opened by a cigarette filter plug winding device, impregnated with a plasticizer, formed into a rod shape using a filter winding paper, and then cut to a predetermined length, giving a cigarette filter.

Cellulose acetate is obtained by subjecting cellulose to acetic acid esterification, and is inherently biodegradable. Actually, however, such biodegradable cellulose acetate is not necessarily regarded as good.

For instance, even when cigarette filters made of cellulose acetate fibers are buried in soil, the shape thereof is still maintained for one to two years, and a very long period of time is required to completely biodegrade the cigarette filters buried in soil.

Cigarette filters are assembled in the form of a cigarette product, and thus distributed to consumers and provided for smoking, and finally discarded after smoking. Moreover, cigarette filters may be directly discarded as production waste from cigarette filter manufacturing plants. The cigarette filters thus discarded are collected, and then buried for disposal thereof. In some cases, cigarette filters are uncollected and left in the natural environment. The discarded cigarette filters are problematic because the presence of discarded filters is visually unappealing and also toxicity adsorbed by the used cigarette filters is leached into the environment and may become potentially biohazardous. These problems occur with typical cellulose acetate structures, as well as cigarette filters.

In such situations, a variety of methods of manufacturing a biodegradable filter tow have been proposed, and these methods include using cellulose acetate made of a predetermined biodegradable polymer, an additive for increasing the degradation rate of cellulose acetate, cellulose acetate having a low degree of substitution (DS) to increase biodegradability, and a filter tow material comprising a biodegradable polymer composite such as PHB (poly-hydroxybutyrate)/PVB (polyvinyl butyral) and starch.

However, satisfactory commercial solutions to produce filters which are degraded at sufficiently fast rates so as to overcome disposal problems and are acceptable to consumers have not yet been developed. The biggest limitation of the aforementioned methods is that it is difficult to achieve an acceptable compromise among biodegradation rate, the absorption profile of the filter material, and tobacco flavor characteristics.

DISCLOSURE

Technical Problem

Therefore, the present invention is intended to provide a lyocell material for a cigarette filter, which is biodegradable, and a method of manufacturing the same.

Technical Solution

A preferred first embodiment of the present invention provides a method of manufacturing a lyocell material for a cigarette filter, comprising crimping lyocell multifilaments, thus obtaining a crimped tow.

In this embodiment, the method may comprise (S1) spinning a lyocell spinning dope comprising a cellulose pulp and an N-methylmorpholine-N-oxide (NMMO) aqueous solution; (S2) coagulating the lyocell spinning dope spun in (S1), thus obtaining lyocell multifilaments; (S3) water-washing the lyocell multifilaments obtained in (S2); (S4) oil-treating the lyocell multifilaments water-washed in (S3); and (S5) crimping the lyocell multifilaments oil-treated in (S4), thus obtaining a crimped tow.

In this embodiment, the lyocell spinning dope in (S1) may comprise 6~16 wt % of the cellulose pulp and 84~94 wt % of the NMMO aqueous solution.

In this embodiment, the cellulose pulp may comprise 85~97 wt % of alpha-cellulose, and may have a degree of polymerization (DPw) of 600~1700.

In this embodiment, coagulating in (S2) may comprise primary coagulation using air quenching (Q/A) including supplying cold air to the spinning dope and secondary coagulation including immersing the primarily coagulated spinning dope in a coagulation solution.

In this embodiment, air quenching may be performed by supplying the cold air at a temperature of 4~15° C. and a wind velocity of 5~50 m/s to the spinning dope.

In this embodiment, the coagulation solution may have a temperature of 30° C. or less.

In this embodiment, (S5) may comprise crimping the oil-treated lyocell multifilaments using a stuffer box to give a crimped tow having 15~30 crimps per inch.

In this embodiment, (S5) may be performed by supplying steam and applying pressure so that the lyocell multifilaments are crimped.

In this embodiment, the steam may be supplied so that a pressure of the steam is 0.1~1.0 kgf/cm$^2$, and the lyocell multifilaments may be pressed and crimped using a press roller at a pressure of 1.5~2.0 kgf/cm$^2$.

A preferred second embodiment of the present invention provides a lyocell material for a cigarette filter, manufactured by spinning a lyocell spinning dope comprising a cellulose pulp and an N-methylmorpholine-N-oxide (NMMO) aqueous solution to produce lyocell multifilaments which are then crimped.

In this embodiment, the lyocell material may have 15~30 crimps per inch.

In this embodiment, the lyocell spinning dope may comprise 6~16 wt % of the cellulose pulp and 84~94 wt % of the NMMO aqueous solution.

In this embodiment, the cellulose pulp may comprise 85~97 wt % of alpha-cellulose, and may have a degree of polymerization (DPw) of 600~1700.

Advantageous Effects

According to the present invention, a method of manufacturing a lyocell material for a cigarette filter is effective at producing a lyocell material which is highly biodegradable and thus eco-friendly.

BEST MODE

Hereinafter, a detailed description will be given of the present invention.

The present invention addresses a method of manufacturing a lyocell material for a cigarette filter, comprising crimping lyocell multifilaments, thus obtaining a crimped tow.

The method of manufacturing the lyocell material for a cigarette filter includes (S1) spinning a lyocell spinning dope comprising a cellulose pulp and an N-methylmorpholine-N-oxide (NMMO) aqueous solution; (S2) coagulating the lyocell spinning dope spun in (S1), thus obtaining lyocell multifilaments; (S3) water-washing the lyocell multifilaments obtained in (S2); (S4) oil-treating the lyocell multifilaments water-washed in (S3); and (S5) crimping the lyocell multifilaments oil-treated in (S4), thus obtaining a crimped tow.

[Step (S1)]

(S1) is a step of spinning a lyocell spinning dope comprising a cellulose pulp and an N-methylmorpholine-N-oxide (NMMO) aqueous solution.

The lyocell spinning dope may include 6~16 wt % of a cellulose pulp and 84~94 wt % of an NMMO aqueous solution, wherein the cellulose pulp may include 85~97 wt % of alpha-cellulose and may have a degree of polymerization (DPw) of 600~1700.

If the amount of the cellulose pulp is less than 6 wt %, it is difficult to acquire fibrous properties. In contrast, if the amount thereof exceeds 16 wt %, it is difficult to be dissolved in the aqueous solution.

If the amount of the NMMO aqueous solution is less than 84 wt %, the dissolution viscosity may remarkably increase. In contrast, if the amount thereof exceeds 94 wt %, the spinning viscosity may considerably decrease, making it difficult to manufacture uniform fibers in a spinning process.

The NMMO aqueous solution may include NMMO and water at a weight ratio of 93:7 to 85:15. If the weight ratio of NMMO and water exceeds 93:7, the dissolution temperature may increase, and thus cellulose may be degraded upon dissolution of cellulose. In contrast, if the weight ratio thereof is less than 85:15, dissolution performance of the solvent may deteriorate, making it difficult to dissolve cellulose.

The spinning dope is discharged from the spinning nozzle of a donut-shaped spinneret. As such, the spinneret functions to discharge the filamentary spinning dope into a coagulation solution in a coagulation bath through an air gap. Discharging the spinning dope from the spinneret may be performed at 80 to 130° C.

[Step (S2)]

(S2) is a step of coagulating the lyocell spinning dope spun in (S1) to obtain the lyocell multifilaments. Coagulation in (S2) may include primary coagulation including subjecting the spinning dope to air quenching (Q/A) using cold air, and secondary coagulation including immersing the primarily coagulated spinning dope in a coagulation solution.

After discharging of the spinning dope through the donut-shaped spinneret in (S1), the dope may pass through the air gap between the spinneret and the coagulation bath. In the air gap, the cold air is supplied outwards from an air cooling part positioned inside the donut-shaped spinneret, and primary coagulation may be carried out by air quenching for supplying such cold air to the spinning dope.

The factors which have an influence on the properties of the lyocell multifilaments obtained in (S2) include the temperature and the wind velocity of the cold air in the air gap, and coagulating in (S2) may be performed by supplying the cold air at a temperature of 4~15° C. and a wind velocity of 5~50 m/s to the spinning dope.

If the temperature of the cold air upon primary coagulation is lower than 4° C., the surface of the spinneret may be cooled, the cross-section of the lyocell multifilaments may become non-uniform, and the spinning processability may deteriorate. In contrast, if the temperature thereof is higher than 15° C., primary coagulation using the cold air is not sufficient, thus deteriorating the spinning processability.

If the wind velocity of the cold air upon primary coagulation is less than 5 m/s, primary coagulation using the cold air is not sufficient and spinning processability may deteriorate, undesirably causing yarn breakage. In contrast, if the wind velocity thereof exceeds 50 m/s, the spinning dope discharged from the spinneret may be shaken by air and spinning processability may thus deteriorate.

After primary coagulation using air quenching, the spinning dope is supplied into the coagulation bath containing the coagulation solution to undergo secondary coagulation. In order to appropriately carry out secondary coagulation, the temperature of the coagulation solution may be set to 30° C. or less. Because the temperature for secondary coagulation is not excessively high, the coagulation rate may be properly maintained. The coagulation solution may be prepared without particular limitation so long as it has a typical composition in the art to which the present invention belongs.

[Step (S3)]

(S3) is a step of water-washing the lyocell multifilaments obtained in (S2).

Specifically, the lyocell multifilaments obtained in (S2) are placed on a draw roller, and then into a water-washing bath and thus washed with water.

Upon water-washing of the filaments, a water-washing solution at 0 to 100° C. may be used, taking into consideration recovering and reusing the solvent after the water-washing process. The water-washing solution may include water, and may further include other components, as necessary.

[Step (S4)]

(S4) is a step of oil-treating the lyocell multifilaments water-washed in (S3), and the oil-treated multifilaments may be dried.

Oil treatment may be performed by completely immersing the multifilaments in oil, and the amount of oil on the filaments may be maintained uniform by a press roller attached to the entry roll and the release roll of an oil-treating device. The oil functions to decrease friction of the filaments upon contact with the drying roller and the guide and in the crimping process, and also facilitates the formation of the crimps between the fibers.

[Step (S5)]

(S5) is a step of crimping the lyocell multifilaments oil-treated in (S4) to obtain a crimped tow.

Crimping is a process in which the multifilaments are crimped, and is performed using a stuffer box, thus obtaining a crimped tow having 15~30 crimps per inch.

In (S5), steam is supplied and pressure is applied so that the lyocell multifilaments may be crimped.

Specifically, the lyocell multifilaments are supplied with steam at 0.1~1.0 kgf/cm$^2$ through a steam box so as to increase the temperature thereof, and then pressed using a press roller at a pressure of 1.5~2.0 kgf/cm$^2$, thereby forming crimps in the stuffer box.

If the amount of supplied steam is less than 0.1 kgf/cm$^2$, crimps are not efficiently formed. In contrast, if the amount thereof exceeds 1.0 kgf/cm$^2$, the temperature of the stuffer box is increased up to 120° C. or higher, and thereby the filaments are attached to each other and thus do not pass through the stuffer box. Also, if the pressure of the press roller is less than 1.5 kgf/cm$^2$, the number of crimps may not be formed as desired. In contrast, if the pressure thereof exceeds 2.0 kgf/cm$^2$, the pressing force is too strong, and thus the filaments do not pass through the stuffer box.

To satisfy the properties required of a cigarette filter, the number of crimps per inch is regarded as important, and may be set to 15~30, and preferably 25~30. If the number of crimps per inch is less than 15, opening the tow is not easy in the course of manufacturing the cigarette filter, undesirably causing processing problems. Furthermore, suction resistance, filter hardness and filter removal performance corresponding to the properties required of the cigarette filter may become unsatisfactory. In contrast, if the number of crimps per inch exceeds 30, non-uniform pressing may occur in the stuffer box and the tow does not efficiently pass through the box, making it difficult to manufacture a crimped tow.

Because the lyocell material for a cigarette filter, as mentioned above, is biodegradable, it may be biodegraded within a short period of time when discarding a cigarette butt and is thus eco-friendly.

Mode for Invention

A better understanding of the present invention may be obtained through the following examples, which are set forth to illustrate, but are not to be construed as limiting the present invention, which will be apparent to those having ordinary knowledge in the art to which the present invention belongs.

Example 1

A spinning dope having a concentration of 12 wt % for a lyocell material was manufactured by mixing a cellulose pulp having DPw of 820 and 93.9% of alpha-cellulose with an NMMO/H$_2$O solvent mixture (weight ratio 90/10) containing 0.01 wt % of propyl gallate.

The spinning dope was maintained at a spinning temperature of 110° C. at the spinning nozzle of a donut-shaped spinneret, and spun while adjusting the discharge amount and the spinning rate so that the fineness per filament was 1.75 denier. The filamentary spinning dope discharged from the spinning nozzle was fed into a coagulation solution in a coagulation bath through an air gap. The spinning dope was primarily coagulated using cold air at a temperature of 8° C. and a wind velocity of 10 m/s in the air gap.

The coagulation solution had a temperature of 25° C. and was composed of 85 wt % of water and 15 wt % of NMMO. As such, the concentration of the coagulation solution was continuously monitored using a sensor and a refractometer.

The filaments drawn in the air layer through a draw roller were washed with a water-washing solution sprayed using a water-washing device to remove the remaining NMMO, and furthermore, the filaments were sufficiently uniformly impregnated with oil and then squeezed so that the filaments had an oil content of 0.2%, and then dried at 150° C. using a drying roller. Subsequently, the lyocell multifilaments were increased in temperature while passing through a steam box, and then crimped in a stuffer box through a press roller, thus obtaining a lyocell crimped tow. As such, steam was supplied at 0.1 kgf/cm$^2$ and the pressure of the press roller was set to 1.5 kgf/cm$^2$.

Example 2

A lyocell material for a cigarette filter was manufactured in the same manner as in Example 1, with the exception that when obtaining a crimped tow by crimping in a stuffer box, steam was supplied at 0.5 kgf/cm$^2$ and the pressure of the press roller was set to 1.5 kgf/cm$^2$.

Example 3

A lyocell material for a cigarette filter was manufactured in the same manner as in Example 1, with the exception that when obtaining a crimped tow by crimping in a stuffer box, steam was supplied at 0.5 kgf/cm$^2$ and the pressure of the press roller was set to 2.0 kgf/cm$^2$.

Comparative Example 1

A lyocell material for a cigarette filter was manufactured in the same manner as in Example 1, with the exception that when obtaining a crimped tow by crimping in a stuffer box, steam was supplied at 0.5 kgf/cm$^2$ and the pressure of the press roller was set to 2.5 kgf/cm$^2$.

Comparative Example 2

A lyocell material for a cigarette filter was manufactured in the same manner as in Example 1, with the exception that when obtaining a crimped tow by crimping in a stuffer box, steam was supplied at 2.0 kgf/cm$^2$ and the pressure of the press roller was set to 1.5 kgf/cm$^2$.

Comparative Example 3

A lyocell material for a cigarette filter was manufactured in the same manner as in Example 1, with the exception that when obtaining a crimped tow by crimping in a stuffer box, steam was supplied at 0.1 kgf/cm$^2$ and the pressure of the press roller was set to 1.0 kgf/cm$^2$.

(1) Measurement of Number of Crimps

According to KS K 0326, twenty fiber specimens were taken from a few portions where crimps were not damaged, placed on the prepared lustrous paper sheet (space distance 25 mm), and added with an additive comprising celluloid in 4~5% amylacetate so that each specimen was extended by (25±5)% relative to the space distance, after which the specimens were allowed to stand, and thus the adhesive was dried. The number of crimps of each specimen was counted when applying a primary load of 1.96/1000 cN (2 mgf) per 1 D using a crimp tester, and the number of crimps in 25 mm was determined and averaged to one decimal place. The primary load was 1.96/1000 cN (2 mgf) per 1 D.

TABLE 1

| | Crimping steam pressure (kgf/cm$^2$) | Crimping press roller pressure (kgf/cm$^2$) | Number of crimps (/inch) | Note |
|---|---|---|---|---|
| Ex. 1 | 0.1 | 1.5 | 25 | |
| Ex. 2 | 0.5 | 1.5 | 26 | |
| Ex. 3 | 0.5 | 2.0 | 27 | |
| C. Ex. 1 | 0.5 | 2.5 | — | Not crimped |
| C. Ex. 2 | 2.0 | 1.5 | — | Not crimped |
| C. Ex. 3 | 0.1 | 1.0 | 13 | |

As is apparent from the results of measurement of the properties of Table 1, the lyocell materials of Comparative Examples had 13 crimps or could not be crimped, and fell out of the range of 15~30 crimps per inch corresponding to the number of crimps appropriate for a cigarette filter. Therefore, the materials of Comparative Examples can be confirmed to be unsuitable for use as fibers in a cigarette filter.

INDUSTRIAL APPLICABILITY

According to the present invention, the method of manufacturing a lyocell material for a cigarette filter enables the production of a lyocell material for a cigarette filter, which is very biodegradable and thus eco-friendly.

The invention claimed is:

1. A lyocell material for a cigarette filter, manufactured by spinning a lyocell spinning dope comprising a cellulose pulp and an N-methylmorpholine-N-oxide (NMMO) aqueous solution to produce lyocell multifilaments which are then crimped, and the lyocell multifilaments are having 25-30 crimps per inch.

2. The lyocell material of claim 1, wherein the lyocell spinning dope comprises 6~16 wt % of the cellulose pulp and 84-94 wt % of the NMMO aqueous solution.

3. The lyocell material of claim 2, wherein the cellulose pulp comprises 85-97 wt % of alpha-cellulose, and has a degree of polymerization (DPw) of 600-1700.

4. The lyocell material of claim 1, manufactured by a method comprising the following steps:
(S1) spinning a lyocell spinning dope comprising a cellulose pulp and an N-methylmorpholine-N-oxide (NMMO) aqueous solution;
(S2) coagulating the lyocell spinning dope spun in the step (S1), thus obtaining lyocell multifilaments;
(S3) water-washing the lyocell multifilaments obtained in the step (S2);
(S4) oil-treating the lyocell multifilaments water-washed in the step (S3); and
(S5) crimping the lyocell multifilaments oil-treated in the step (S4) using a stuffer box, thus obtaining a crimped tow having 25-30 crimps per inch,
wherein coagulating in the step (S2) comprises a primary coagulation using air quenching (Q/A) including supplying cold air at a temperature of 4-15° C. and a wind velocity of 5-50 m/s to the spinning dope and a secondary coagulation including immersing the primarily coagulated spinning dope in a coagulation solution,
wherein the cold air is supplied outwardly from an air cooling part positioned inside a donut-shaped spinneret, and
wherein the step (S5) is performed by supplying steam having a pressure of 0.1-1.0 kgf/cm$^2$ to an interior of the stuffer box and pressing the lyocell multifilaments using a press roller at a pressure of 1.5-2.0 kgf/cm$^2$ to give the lyocell multifilaments having 25-30 crimps per inch.

5. The lyocell material of claim 4, wherein the coagulation solution has a temperature of 30° C. or less.

* * * * *